(12) United States Patent
Chuang

(10) Patent No.: US 12,316,026 B2
(45) Date of Patent: May 27, 2025

(54) WIRELESS COMMUNICATION DEVICE AND ANTENNA MATCHING CIRCUIT

(71) Applicant: WISTRON NEWEB CORPORATION, Hsinchu (TW)

(72) Inventor: Fu-Chi Chuang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 293 days.

(21) Appl. No.: 18/308,721

(22) Filed: Apr. 28, 2023

(65) Prior Publication Data

US 2024/0136712 A1   Apr. 25, 2024
US 2024/0235023 A9   Jul. 11, 2024

(30) Foreign Application Priority Data

Oct. 20, 2022   (TW) .................................. 111139734

(51) Int. Cl.
*H04B 1/00* (2006.01)
*H01Q 3/24* (2006.01)
*H01Q 5/335* (2015.01)

(52) U.S. Cl.
CPC ............... *H01Q 5/335* (2015.01); *H01Q 3/24* (2013.01); *H04B 1/006* (2013.01)

(58) Field of Classification Search
CPC .......... H01Q 5/335; H01Q 3/24; H04B 1/006
See application file for complete search history.

(56) References Cited

U.S. PATENT DOCUMENTS

| 10,361,490 | B1 * | 7/2019 | Lee | ........................... | H01Q 9/42 |
| 2017/0230074 | A1 * | 8/2017 | Rose | ........................... | H03F 3/24 |
| 2018/0034624 | A1 | 2/2018 | Shirinfar et al. | | |
| 2022/0291395 | A1 | 9/2022 | Iyengar et al. | | |
| 2023/0420845 | A1 * | 12/2023 | Huang | ................... | H01Q 21/10 |
| 2025/0047341 | A1 * | 2/2025 | Kim | ....................... | H04B 7/061 |

FOREIGN PATENT DOCUMENTS

| CN | 103597659 B | | 6/2016 |
| CN | 111293429 A | | 6/2020 |
| CN | 114760378 A | * | 7/2022 |
| TW | M537317 U | | 2/2017 |
| WO | WO-2023167785 A1 | * | 9/2023 |

* cited by examiner

*Primary Examiner* — Seokjin Kim
(74) *Attorney, Agent, or Firm* — McClure, Qualey & Rodack, LLP

(57) ABSTRACT

A wireless communication device and an antenna matching circuit are provided. The wireless communication device includes an RF transceiver, a first SPDT switch, a low noise amplifier, a power amplifier, and the antenna matching circuit. The antenna matching circuit includes a second SPDT switch, a first antenna element, a second antenna element, a first transmission path, a second transmission path, and a plurality of SPST switches. The second SPDT switch is connected to the first SPDT switch. When the antenna matching circuit is switched to a first mode, the second SPDT switch is switched to the first transmission path, and the first antenna element is used to generate a first radiation pattern. When the antenna matching circuit is switched to a second mode, the second SPDT switch is switched to the second transmission path, and the second antenna element is used to generate a second radiation pattern.

15 Claims, 6 Drawing Sheets

WIRELESS COMMUNICATION DEVICE AND ANTENNA MATCHING CIRCUIT

CROSS-REFERENCE TO RELATED PATENT APPLICATION

This application claims the benefit of priority to Taiwan Patent Application No. 111139734, filed on Oct. 20, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless communication device and an antenna matching circuit, and more particularly to a wireless communication device and an antenna matching circuit that have a multi-polarized antenna structure.

BACKGROUND OF THE DISCLOSURE

With the development and popularization of wireless networks in recent years, wireless networks are now widely installed in public places, educational institutes, or home environments, and allow users to connect to the Internet via a wireless device. In the related art, an antenna element of the wireless device is a monopole antenna, and a signal quality of the monopole antenna can be inconsistent due to changes of an external environment. Therefore, when using the wireless device, the user may need to adjust an antenna position of the wireless device for obtaining an improved signal receiving capability.

Therefore, how to improve on the above-mentioned issues through an improvement in the wireless device has become an important issue to be addressed in the related art.

SUMMARY OF THE DISCLOSURE

In response to the above-referenced technical inadequacy, the present disclosure provides a wireless communication device and an antenna matching circuit to address an issue of a signal quality of a monopole antenna being inconsistent due to changes of an external environment.

In order to solve the above-mentioned problem, one of the technical aspects adopted by the present disclosure is to provide a wireless communication device. The wireless communication device includes a radio frequency transceiver, a first single pole double throw (SPDT) switch, a low noise amplifier, a power amplifier, and an antenna matching circuit. The first SPDT switch is connected to the radio frequency transceiver. The low noise amplifier is connected between the radio frequency transceiver and the first SPDT switch. The power amplifier is connected between the radio frequency transceiver and the first SPDT switch. The antenna matching circuit is operable for an operating frequency. The antenna matching circuit includes a second SPDT switch, a first antenna element, a second antenna element, a first transmission path, a second transmission path, and a plurality of single pole single throw (SPST) switches. The second SPDT switch is connected to the first SPDT switch. The first antenna element and the second antenna element are connected to the second SPDT switch. The first transmission path is connected between the first antenna element and the second SPDT switch. The second transmission path is connected between the second antenna element and the second SPDT switch. The SPST switches are connected between the first transmission path and the second transmission path. When the antenna matching circuit is switched to a first mode, the second SPDT switch is switched to the first transmission path, the SPST switches are in non-conducting states, and the first antenna element is used to generate a first radiation pattern. When the antenna matching circuit is switched to a second mode, the second SPDT switch is switched to the second transmission path, the SPST switches are in the non-conducting states, and the second antenna element is used to generate a second radiation pattern. The first radiation pattern has a first polarization direction, the second radiation pattern has a second polarization direction, and the first polarization direction is orthogonal to the second polarization direction.

In order to solve the above-mentioned problem, another one of the technical aspects adopted by the present disclosure is to provide an antenna matching circuit. The antenna matching circuit is operable for an operating frequency, and includes a SPDT switch, a first antenna element, a second antenna element, a first transmission path, a second transmission path, and a plurality of SPST switches. The first antenna element and the second antenna element are connected to the SPDT switch. The first transmission path is connected between the first antenna element and the SPDT switch. The second transmission path is connected between the second antenna element and the SPDT switch. The SPST switches are connected between the first transmission path and the second transmission path. When the antenna matching circuit is switched to a first mode, the SPDT switch is switched to the first transmission path, the SPST switches are in non-conducting states, and the first antenna element is used to generate a first radiation pattern. When the antenna matching circuit is switched to a second mode, the SPDT switch is switched to the second transmission path and the SPST switches are in the non-conducting states, and the second antenna element is used to generate a second radiation pattern. The first radiation pattern has a first polarization direction, the second radiation pattern has a second polarization direction, and the first polarization direction is orthogonal to the second polarization direction.

Therefore, in the wireless communication device and the antenna matching circuit provided by the present disclosure, by virtue of "in response to the antenna matching circuit being switched to a first mode, the second SPDT switch is switched to the first transmission path, the SPST switches are in non-conducting states, and the first antenna element is used to generate a first radiation pattern," "in response to the antenna matching circuit being switched to a second mode, the second SPDT switch is switched to the second transmission path, the SPST switches are in the non-conducting states, and the second antenna element is used to generate a second radiation pattern," and "the first radiation pattern having a first polarization direction, the second radiation pattern having a second polarization direction, and the first polarization direction being orthogonal to the second polarization direction," a polarization direction of an antenna can be changed with different environments for improving a signal receiving capability.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
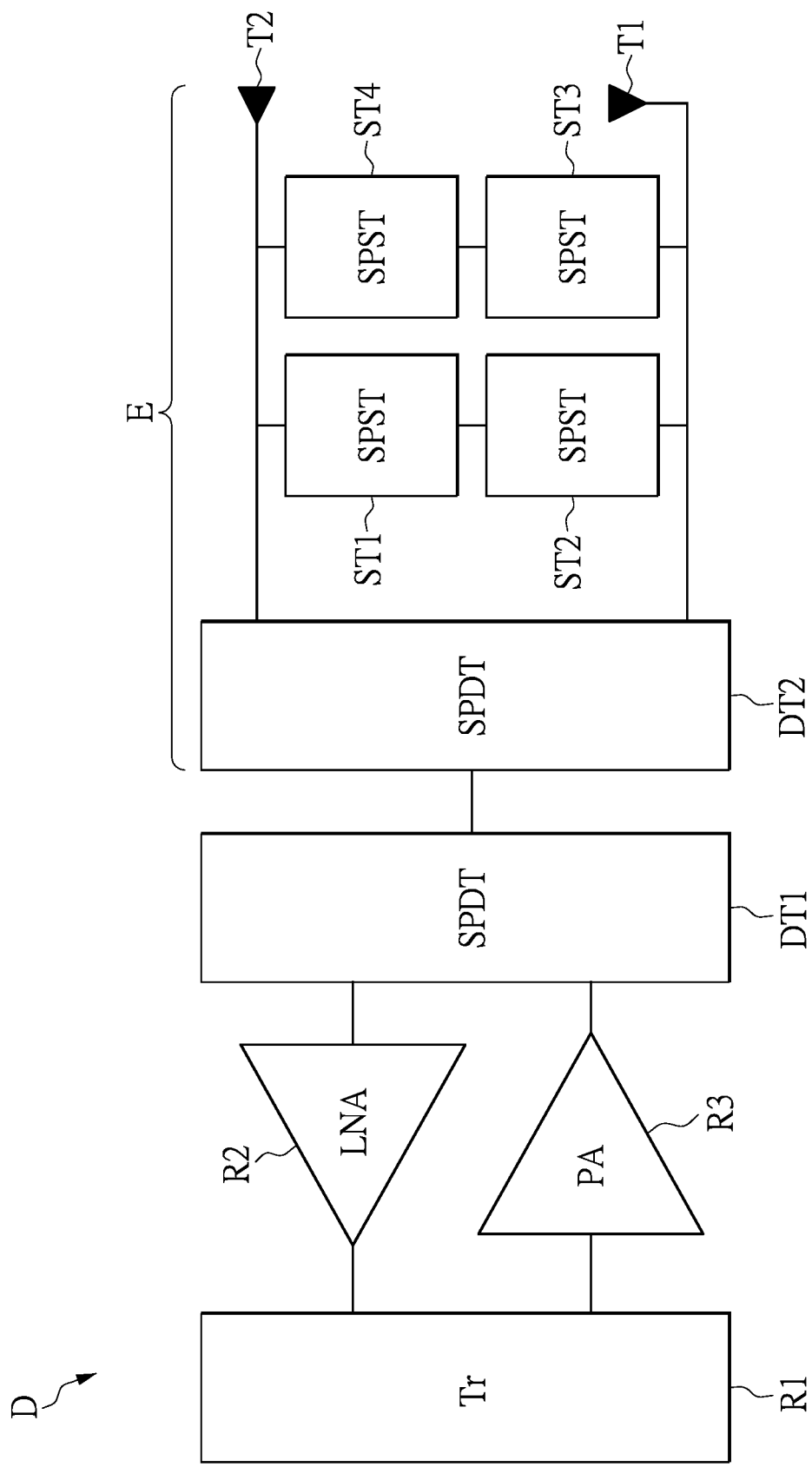
FIG. 1 is a schematic view of a wireless communication device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

Referring to FIG. 1, FIG. 1 is a schematic view of a wireless communication device according to the present disclosure. The present disclosure provides a wireless communication device D, which includes a radio frequency transceiver R1, a single pole double throw (SPDT) switch DT1, a low noise amplifier R2, a power amplifier R3, and an antenna matching circuit E. The first SPDT switch DT1 is connected between the radio transceiver R1 and the antenna matching circuit E. The low noise amplifier R2 is connected between the radio transceiver R1 and the first SPDT switch DT1. The power amplifier R3 is connected between the radio frequency transceiver R1 and the first SPDT switch DT1. The antenna matching circuit E is formed by a circuit substrate 1 and a conductive metal material disposed on two opposite surfaces of the circuit substrate 1. The antenna matching circuit E is operable for an operating frequency that, for example, ranges from 2.4 GHz to 2.5 GHz, and the antenna matching circuit E can be used to generate a lowest operating frequency within said range. According to an initial wavelength of the lowest operating frequency in vacuum and a dielectric coefficient of the circuit substrate 1, a wavelength λ can be calculated by the following relationship.

$$\lambda = \lambda_e / (\varepsilon_r)^{1/2}.$$

Here, $\lambda_e$ is the initial wavelength, and $\varepsilon_r$ is the dielectric coefficient of the circuit substrate 1.

The radio frequency transceiver R1 can transmit an output signal. The output signal passes through the power amplifier R3 and the first SPDT switch DT1, and then is output from the antenna matching circuit E. On the other hand, the antenna matching circuit E can also receive an input signal. The input signal passes through the first SPDT switch DT1 and the low noise amplifier R2, and then enters into the radio frequency transceiver R1.

First Embodiment

Figure 2:
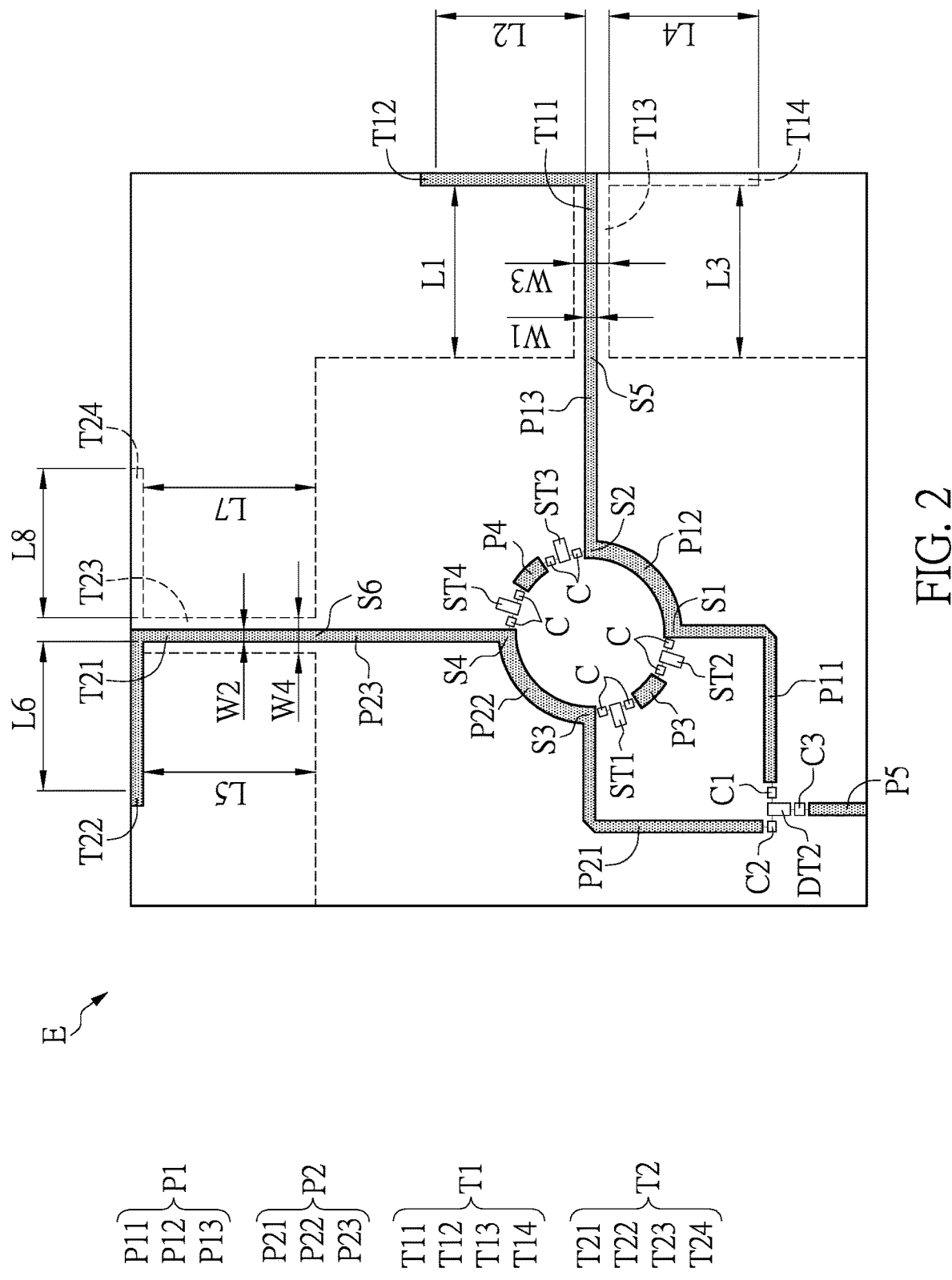
FIG. 2 is a schematic view of an antenna matching circuit according to a first embodiment of the present disclosure.

Referring to FIG. 1 and FIG. 2, FIG. 2 is a schematic view of an antenna matching circuit according to a first embodiment of the present disclosure. The antenna matching circuit E provided in a first embodiment of the present disclosure includes a second SPDT switch DT2, a first antenna element T1, a second antenna element T2, a first transmission path P1, a second transmission path P2, and a plurality of single pole single throw (SPST) switches. The second SPDT switch DT2 is connected to the first SPDT switch DT1. The first antenna element T1 and the second antenna element T2 are connected to the second SPDT switch DT2. The first transmission path P1 is connected between the first antenna element T1 and the second SPDT switch DT2. The second transmission path P2 is connected between the second antenna element T2 and the second SPDT switch DT2. The SPST switches are connected between the first transmission path P1 and the second transmission path P2.

The first transmission path P1 includes a first section P11, a second section P12, and a third section P13. The first section P11 is connected to the second SPDT switch DT2, the third section P13 is connected to the first antenna element T1, and the second section P12 is connected between the first section P11 and the third section P13. The second section P12 intersects with the first section P11 at a first connection point S1, and the second section P12 intersects with the third section P13 at a second connection point S2. The second transmission path P2 includes a fourth section P21, a fifth section P22, and a sixth section P23. The fourth section P21 is connected to the second SPDT switch DT2. The sixth section P23 is connected to the second antenna element T2. The fifth section P22 is connected between the fourth section P21 and the sixth section P23. The fifth section P22 intersects with the fourth section P21 at a third connection point S3. The fifth section P22 intersects with the sixth section P23 at a fourth connection point S4.

The antenna matching circuit E further includes a third transmission path P3, a fourth transmission path P4, and a fifth transmission path P5. The third transmission path P3 is connected between the first connection point S1 and the third connection point S3. The fourth transmission path P4 is connected between the second connection point S2 and the fourth connection point S4. The fifth transmission path P5 is connected between the second SPDT switch DT2 and the first SPDT switch DT1.

Reference is further made to FIG. 2. In the present disclosure, the SPST switches include a first SPST switch ST1, a second SPST switch ST2, a third SPST switch ST3, and a fourth SPST switch ST4. The first SPST switch ST1 and the second SPST switch ST2 are connected in series in the third transmission path P3, and the third SPST switch ST3 and the fourth SPST switch ST4 are connected in series in the fourth transmission path P4. It is worth mentioning that the first SPST switch ST1 is adjacent to the third connection point S3, the second SPST switch ST2 is adjacent to the first connection point S1, the third SPST switch ST3 is adjacent to the second connection point S2, and the fourth SPST switch ST4 is adjacent to the fourth connection point S4. Therefore, the four SPST switches are arranged to be adjacent to the first connection point S1, the second connection point S2, the third connection point S3, and the fourth connection point S4, respectively, so as to prevent generation of a stub.

Moreover, the antenna matching circuit E further includes a plurality of capacitors C. The second SPDT switch DT2, the first SPST switch ST1, the second SPST switch ST2, the third SPST switch ST3, and the fourth SPST switch ST4 include a plurality of terminals, and the capacitors C are respectively the terminals. Since the second SPDT switch DT2, the first SPST switch ST1, the second SPST switch ST2, the third SPST switch ST3, and the fourth SPST switch ST4 all have direct current (DC) characteristics (i.e., a DC signal may pass through each switch during an operation process thereof), the capacitors C can be connected in series to the terminals of the second SPDT switch DT2 and the SPST switches (ST1 to ST4) as a DC block. In this way, it can be ensured that no DC signal flows into the antenna matching circuit E.

In addition, the three capacitors C connected in series to the three terminals of the second SPDT switch DT2 can be further defined as a first capacitor C1, a second capacitor C2, and a third capacitor C3. The first capacitor C1 is connected in series between the second SPDT switch DT2 and the first section P11, the second capacitor C2 is connected in series between the second SPDT switch DT2 and the fourth section P21, and the third capacitor C3 is connected in series between the second SPDT switch DT2 and the fifth transmission path P5. A length of the first section P11 (i.e., a length between the first capacitor C1 and the first connection point S1) is equal to a length of the fourth section P21 (i.e., a length between the second capacitor C2 and the third connection point S3), and an impedance value of each of the first section P11 and the fourth section P21 is about 50 ohm.

As shown in FIG. 2, the second section P12, the fourth transmission path P4, the fifth section P22, and the third transmission path P3 jointly form a loop. The shape of the loop is not limited in the present disclosure. For example, the loop can be circular, square or rhombic. A length of the second section P12 (i.e., a length between the first connection point S1 and the second connection point S2) and a length of the fifth section P22 (i.e., a length between the third connection point S3 and the fourth connection point S4) are both equal to one-fourth of the wavelength ($\lambda/4$) of the operating frequency generated by the antenna matching circuit E. Lengths of the third transmission path P3 and the fourth transmission path P4 are both equal to one-fourth wavelength ($\lambda/4$) of the operating frequency generated by the antenna matching circuit E. By designing each of the lengths of the second section P12, the fourth transmission path P4, the fifth section P22, and the third transmission path P3 to be equal to one-fourth of the wavelength ($\lambda/4$) of the operating frequency, signals that are input into the first antenna element T1 and the second antenna element T2 can have a path difference of one-fourth of the wavelength ($\lambda/4$), such that an isolation between the first antenna element T1 and the second antenna element T2 can be increased. Moreover, impedance values of the third transmission path P3 and the fourth transmission path P4 are greater than impedance values of the second section P12 and the fifth section P22. In the first embodiment, the impedance values of the third transmission path P3 and the fourth transmission path P4 are both about 50 ohm, and the impedance values of the second section P12 and the fifth section P22 are both about 35 ohm. Therefore, when the signal transmitted by the radio frequency transceiver R1 passes through the second SPDT switch DT2 and reaches the first antenna element T1 and the second antenna element T2 through one of the transmission paths (e.g., the first section P11 of the first transmission path P1), a small part of energy of the signal can be prevented from being transmitted back to the radio frequency transceiver R1 through another one of the transmission paths (e.g., the fourth section P21 of the second transmission path P2).

Figure 3:
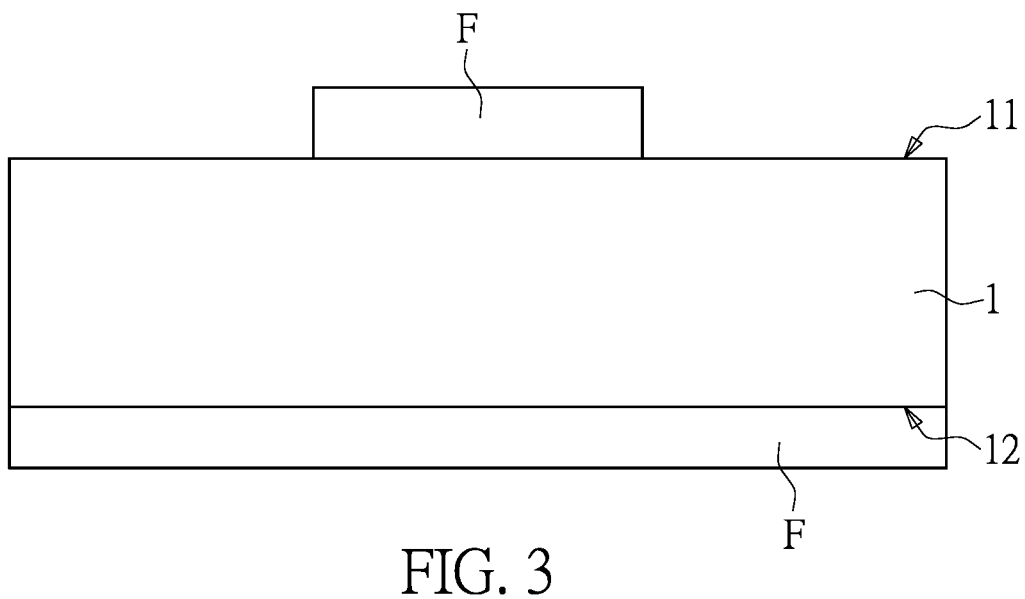
FIG. 3 is a schematic cross-sectional view of the antenna matching circuit according to the present disclosure.

Referring to FIG. 2 and FIG. 3, FIG. 3 is a schematic cross-sectional view of the antenna matching circuit according to the present disclosure. Specifically, the circuit substrate 1 has a first surface 11 and a second surface 12 that are opposite to each other, and the multiple transmission paths (P1 to P5), the second SPDT switch DT2, and the multiple SPST switches (ST1 to ST4) are disposed on the first surface 11. For example, the multiple transmission paths (P1 to P5) are transmission lines formed by metal copper foil. As shown in FIG. 3, a metal copper foil F is disposed on the first surface 11 and the second surface 12 of the circuit substrate 1. The first antenna element T1 and the second antenna element T2 are dipole antennas formed by the metal copper foil F. The first antenna element T1 includes a first radiating portion T11, a second radiating portion T12, a third radiating portion T13, and a fourth radiating portion T14. The first radiating portion T11 and the second radiating portion T12 are disposed on the first surface 11, and the third radiating portion T13 and the fourth radiating portion T14 are disposed on the second surface 12. An orthogonal projection of the first radiating portion T11 that is projected onto the second surface 12 overlaps with an orthogonal projection of the third radiating portion T13 that is projected onto the second surface 12. The second antenna element T2 includes a fifth radiating portion T21, a sixth radiating portion T22, a seventh radiating portion T23, and an eighth radiating portion T24. The fifth radiating portion T21 and the sixth radiating portion T22 are disposed on the first surface 11, and the seventh radiating portion T23 and the eighth radiating portion T24 are disposed on the second surface 12. An orthogonal projection of the fifth radiating portion T21 that is projected onto the second surface 12 overlaps with an orthogonal projection of the seventh radiating portion T23 that is projected onto the second surface 12.

The third section P13 intersects with the first radiating portion T11 at a fifth connection point S5, and the sixth section P23 intersects with the fifth radiating portion T21 at a sixth connection point S6. A length of the third section P13 (i.e., a length between the second connection point S2 and the fifth connection point S5) is equal to a length of the sixth section P23 (i.e., a length between the fourth connection point S4 and the sixth connection point S6), and impedance values of the third section P13 and the sixth section P23 are both about 50 ohm.

In addition, the first antenna element T1 and the second antenna element T2 are symmetrical structures, and both have the same structural design. In the first antenna element T1, a length L1 of the first radiating portion T11 is equal to a length L3 of the third radiating portion T13. A width W3 of the third radiating portion T13 is greater than a width W1 of the first radiating portion T11. In the first embodiment, the width W3 is three times the width W1. A length L2 of the second radiating portion T12 is equal to a length L4 of the fourth radiating portion T14. In the second radiating element T2, a length L5 of the fifth radiating portion T21 is equal to a length L7 of the seventh radiating portion T23. A width W4 of the seventh radiating portion T23 is greater than a width W2 of the fifth radiating portion T21. In the first embodiment, the width W4 is three times the width W2. A length L6 of the sixth radiating portion T22 is equal to a length L8 of the eighth radiating portion T24. In addition, the length L1 of the first radiating portion T11 is equal to the length L5 of the fifth radiating portion T21. The length L1 and the length L5 are about three-tenths of the wavelength (0.3λ) of the operating frequency, and impedance values of the length L1 and the length L5 are both about 50 ohm. The length L2 of the second radiating portion T12 is equal to the length L6 of the sixth radiating portion T22. The length L3 of the third radiating portion T13 is equal to the length L7 of the seventh radiating portion T23. The length L4 of the fourth radiating portion T14 is equal to the length L8 of the eighth radiating portion T24, and the length L4 and the length L8 are about one-fourth of the wavelength (λ/4) of the operating frequency.

The second SPDT switch DT2 can be switched between the first transmission path P1 and the second transmission path P2, and each SPST switch can be switched between a conducting state and a non-conducting state. Therefore, the antenna matching circuit E can generate different radiation patterns with different polarization directions through switching modes of the second SPDT switch DT2 and the multiple SPST switches (ST1 to ST4).

For example, the antenna matching circuit E has a first mode, a second mode, a third mode, and a fourth mode. The radio frequency transceiver R1 can sequentially transmit a signal to a to-be-detected object through the first mode, the second mode, the third mode and the fourth mode. Moreover, according to signal strengths measured in these modes, the radio frequency transceiver R1 further selects the one mode that has a maximum signal strength for signal connection. When the antenna matching circuit E is switched to the first mode, the second SPDT switch DT2 is switched to the first transmission path P1, the SPST switches (ST1 to ST4) are in the non-conducting states, and the first antenna element T1 is used to generate a first radiation pattern. When the antenna matching circuit E is switched to the second mode, the second SPDT switch DT2 is switched to the second transmission path P2, the SPST switches (ST1 to ST4) are in the non-conducting states, and the second antenna element T2 is used to generate a second radiation pattern. The first radiation pattern has a first polarization direction, and the second radiation pattern has a second polarization direction. In the first embodiment, the antenna matching circuit E shown in FIG. 2 is configured to be vertical to the ground (not shown in the figures), and the second radiation portion T12 and the fourth radiation portion T14 of the first antenna element T1 are vertical to the ground. Therefore, the first polarization direction generated by the first antenna element T1 is a vertical polarization direction. On the other hand, the sixth radiation portion T22 and the eighth radiation portion T24 of the second antenna element T2 are parallel to the ground, so that the second polarization direction generated by the second antenna element T2 is a horizontal polarization direction. The first polarization direction is orthogonal to the second polarization direction.

When the antenna matching circuit E is switched to the third mode, the second SPDT switch DT2 is switched to the first transmission path P1, and the SPST switches (ST1 to ST4) are in the conducting states. When a first signal transmitted by the radio frequency transceiver R1 is input into the fifth transmission path P5 and passes through the first transmission path P1, the first signal travels around the second section P12, the fourth transmission path P4, the fifth section P22, and the third transmission path P3 along a counterclockwise direction. Therefore, one part of energy of the first signal will be transmitted to the first antenna element T1, and then another part of the energy of the first signal will be transmitted to the second antenna element T2. Accordingly, the first antenna element T1 and the second antenna element T2 can generate a third radiation pattern with a third polarization direction, and the third polarization direction is a right-hand circular polarization (RHCP) direction.

When the antenna matching circuit E is switched to the fourth mode, the second SPDT switch DT2 is switched to the second transmission path P2, and the SPST switches (ST1 to ST4) are in the conducting states. When a second signal transmitted by the radio frequency transceiver R1 is input into the fifth transmission path P5 and passes through the second transmission path P2, the second signal travels around the fifth section P22, the fourth transmission path P4, the second section P12, and the third transmission path P3 along a clockwise direction. Therefore, one part of energy of the second signal will be transmitted to the second antenna element T2, and then another part of the energy of the second signal will be transmitted to the first antenna element T1. Accordingly, the first antenna element T1 and the second antenna element T2 are used to generate a fourth radiation pattern with a fourth polarization direction, and the fourth polarization direction is a left-hand circular polarization (LHCP) direction.

Figure 4:
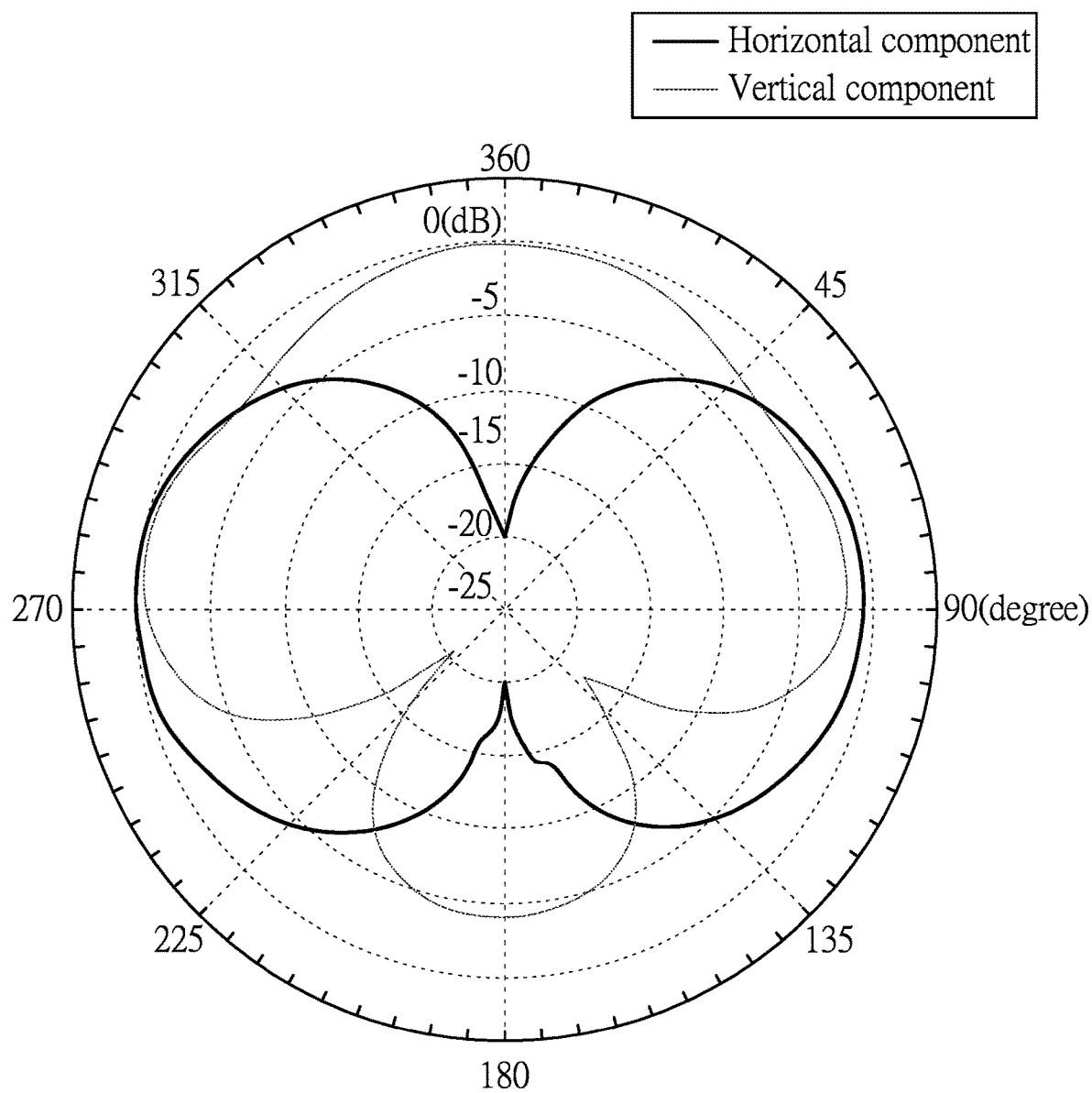
FIG. 4 is a schematic view of a radiation pattern of the antenna matching circuit according to the first embodiment of the present disclosure.
Figure 5:
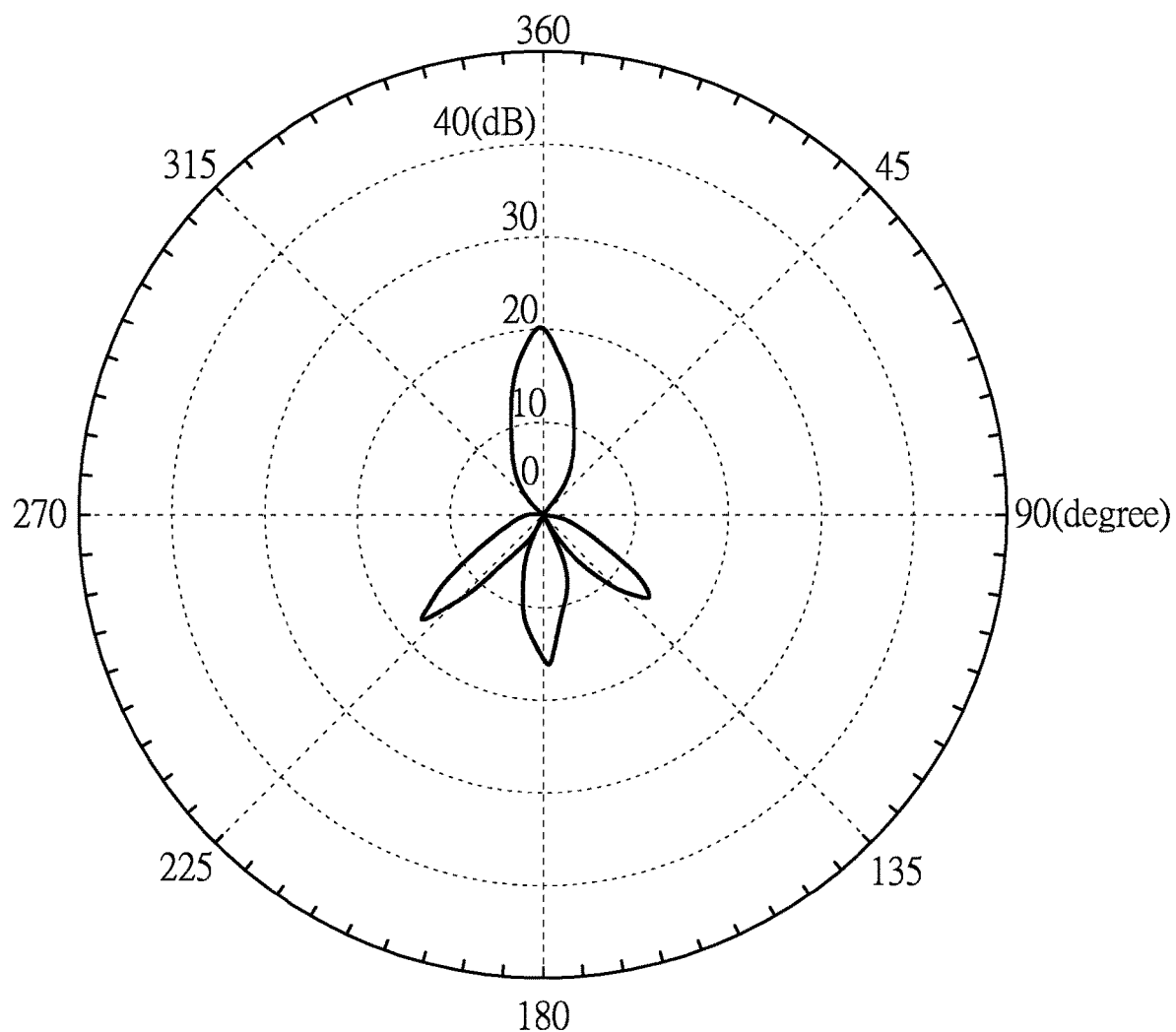
FIG. 5 is a diagram showing an axial ratio of the radiation pattern of the antenna matching circuit according to the first embodiment of the present disclosure.

Referring to FIG. 4 and FIG. 5, FIG. 4 is a schematic view of a radiation pattern of the antenna matching circuit according to the first embodiment of the present disclosure, and FIG. 5 is a diagram showing an axial ratio of the radiation pattern of the antenna matching circuit according to the first embodiment of the present disclosure. The third mode of the antenna matching circuit E is exemplified in FIGS. 4 and 5 for illustrative purposes. As shown in FIG. 4, the first antenna element T1 generates a radiation pattern of a vertical component, the second antenna element T2 generates a radiation pattern of a horizontal component, and an axial ratio diagram converted from the two radiation patterns is shown in FIG. 5. As shown in FIG. 5, an angular range where the axial ratio is less than 5 (the axial ratio of an ideal circular polarized antenna is 1) is about 240 degrees. In other words, in FIG. 4, the two radiation patterns have the same radiation energy (the horizontal component and the vertical component of the ideal circular polarized antenna have the same radiation energy), and the angular range is about 240 degrees. Therefore, the radiation pattern generated by the first antenna element T1 and the second antenna element T2 can have a circular polarization effect.

Second Embodiment

Figure 6:
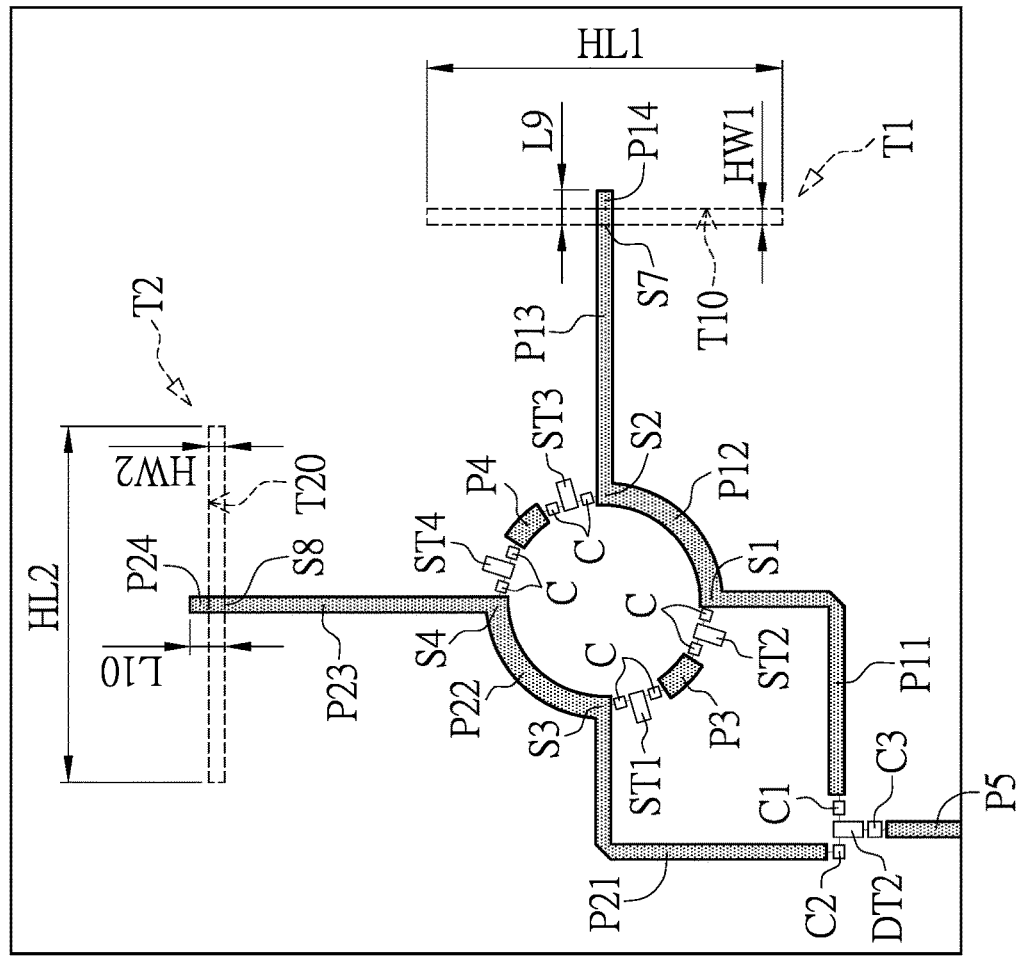
FIG. 6 is a schematic view of the antenna matching circuit according to a second embodiment of the present disclosure.

Referring to FIG. 6, FIG. 6 is a schematic view of the antenna matching circuit according to a second embodiment of the present disclosure. In the second embodiment, the first antenna element T1 and the second antenna element T2 are slot antennas. The first transmission path P1 further includes a seventh section P14, and the second transmission path P2 further includes an eighth section P24. An aspect ratio of the seventh section P14 and the eighth section P24 is about 2. The seventh section P14 intersects with the third section P13 at a seventh connection point S7, and the eighth section P24 intersects with the sixth section P23 at an eighth connection point S8. The first antenna element T1 includes a first slot T10, the second antenna element T2 includes a second slot T20, and the first slot T10 and the second slot T20 are formed on the metal copper foil F that is disposed on the second surface 12 of the circuit substrate 1. A length HL1 of the first slot T10 is equal to a length HL2 of the second slot T20. An orthogonal projection of the seventh section P14 that is projected onto the second surface 12 partially overlaps with an orthogonal projection of the first slot T10 that is projected onto the second surface 12. That is to say, the seventh section P14 crosses over the first slot T10, and a length L9 of the seventh section P14 is greater than a width HW1 of the first slot T10. An orthogonal projection of the eighth section P24 that is projected onto the second surface 12 partially overlaps with an orthogonal projection of the second slot T20 that is projected onto the second surface 12. That is to say, the eighth section P24 crosses over the second slot T20, and a length L10 of the eighth section P24 is greater than a width HW2 of the second slot T20. In addition, the length HL1 of the first slot T10 and the length HL2 of the second slot T20 are both about one-half of the wavelength ($\lambda/2$) of the operating frequency.

Beneficial Effects of the Embodiments

In conclusion, in the wireless communication device D and the antenna matching circuit E provided by the present disclosure, by virtue of "in response to the antenna matching circuit E being switched to a first mode, the second SPDT switch DT2 is switched to the first transmission path P1, the SPST switches (ST1 to ST4) are in non-conducting states, and the first antenna element T1 is used to generate a first radiation pattern," "in response to the antenna matching circuit E being switched to a second mode, the second SPDT switch DT2 is switched to the second transmission path P2, the SPST switches (ST1 to ST4) are in the non-conducting states, and the second antenna element T2 is used to generate a second radiation pattern," and "the first radiation pattern having a first polarization direction, the second radiation pattern having a second polarization direction, and the first polarization direction being orthogonal to the second polarization direction," a polarization direction of an antenna can be changed with different environments for improving a signal receiving capability.

Moreover, the antenna matching circuit E has a first mode, a second mode, a third mode, and a fourth mode. When the antenna matching circuit E is switched to the first mode, the second SPDT switch DT2 is switched to the first transmission path P1, and the SPST switches (ST1 to ST4) are in the non-conducting states. When the antenna matching circuit E is switched to the second mode, the second SPDT switch DT2 is switched to the second transmission path P2, and the SPST switches (ST1 to ST4) are in the non-conducting states. When the antenna matching circuit E is switched to the third mode, the second SPDT switch DT2 is switched to the first transmission path P1, and the SPST switches (ST1 to ST4) are in conducting states. When the antenna matching circuit E is switched to the fourth mode, the second SPDT switch DT2 is switched to the second transmission path P2, and the SPST switches (ST1 to ST4) are in the conducting states. Accordingly, the antenna matching circuit E can generate various polarization directions (e.g., a horizontal polarization direction, a vertical polarization direction, a right-hand circular polarization direction, and a left-hand circular polarization direction) by switching different modes, such that a user does not need to specifically adjust an antenna position for obtaining an improved signal receiving capability.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless communication device, comprising:
   a radio frequency transceiver;
   a first single pole double throw (SPDT) switch connected to the radio frequency transceiver;
   a low noise amplifier connected between the radio frequency transceiver and the first SPDT switch;
   a power amplifier connected between the radio frequency transceiver and the first SPDT switch; and
   an antenna matching circuit, wherein the antenna matching circuit is operable for an operating frequency and includes:
      a second SPDT switch connected to the first SPDT switch;
      a first antenna element and a second antenna element connected to the second SPDT switch;
      a first transmission path and a second transmission path, wherein the first transmission path is connected between the first antenna element and the second SPDT switch, and the second transmission path is connected between the second antenna element and the second SPDT switch; and a plurality of single pole single throw (SPST) switches connected between the first transmission path and the second transmission path;

wherein, in response to the antenna matching circuit being switched to a first mode, the second SPDT switch is switched to the first transmission path, the SPST switches are in non-conducting states, and the first antenna element is used to generate a first radiation pattern; wherein, in response to the antenna matching circuit being switched to a second mode, the second SPDT switch is switched to the second transmission path, the SPST switches are in the non-conducting states, and the second antenna element is used to generate a second radiation pattern; wherein the first radiation pattern has a first polarization direction, the second radiation pattern has a second polarization direction, and the first polarization direction is orthogonal to the second polarization direction.

2. The wireless communication device according to claim 1, wherein the first transmission path includes a first section, a second section, and a third section, the first section is connected to the second SPDT switch, the third section is connected to the first antenna element, the second section is connected between the first section and the third section, the second section intersects with the first section at a first connection point, the second section intersects with the third section at a second connection point, the second transmission path includes a fourth section, a fifth section, and a sixth section, the fourth section is connected to the second SPDT switch, the sixth section is connected to the second antenna element, the fifth section is connected between the fourth section and the sixth section, the fifth section intersects with the fourth section at a third connection point, the fifth section intersects with the sixth section at a fourth connection point, and lengths of the second section and the fifth section are both equal to one-fourth of a wavelength of the operating frequency.

3. The wireless communication device according to claim 2, wherein the antenna matching circuit further includes a third transmission path, a fourth transmission path, and a fifth transmission path, the third transmission path is connected between the first connection point and the third connection point, the fourth transmission path is connected between the second connection point and the fourth connection point, lengths of the third transmission path and the fourth transmission path are both equal to one-fourth of the wavelength of the operating frequency, impedance values of the third transmission path and the fourth transmission path are greater than impedance values of the second section and the fifth section, and the fifth transmission path is connected to the second SPDT switch.

4. The wireless communication device according to claim 2, wherein the antenna matching circuit further includes a third transmission path and a fourth transmission path, the third transmission path is connected between the first connection point and the third connection point, the fourth transmission path is connected between the second connection point and the fourth connection point, lengths of the third transmission path and the fourth transmission path are both equal to one-fourth of the wavelength of the operating frequency, the SPST switches include a first SPST switch, a second SPST switch, a third SPST switch, and a fourth SPST switch, the first SPST switch and the second SPST switch are connected in series in the third transmission path, and the third SPST switch and the fourth SPST switch are connected in series in the fourth transmission path.

5. The wireless communication device according to claim 4, wherein the antenna matching circuit further includes a plurality of capacitors, and the second SPDT switch, the first SPST switch, the second SPST switch, the third SPST switch, and the fourth SPST switch include a plurality of terminals, and the capacitors are respectively connected to the terminals.

6. The wireless communication device according to claim 1, wherein the antenna matching circuit further includes a circuit substrate, the circuit substrate has a first surface and a second surface that are opposite to each other, and the first transmission path, the second transmission path, the second SPDT switch, and the SPST switches are disposed on the first surface; wherein the first antenna element includes a first radiating portion, a second radiating portion, a third radiating portion, and a fourth radiating portion, the first radiating portion and the second radiating portion are disposed on the first surface, the third radiating portion and the fourth radiating portion are disposed on the second surface, an orthogonal projection of the first radiating portion that is projected onto the second surface overlaps with an orthogonal projection of the third radiating portion that is projected onto the second surface, the second antenna element includes a fifth radiating portion, a sixth radiating portion, a seventh radiating portion, and an eighth radiating portion, the fifth radiating portion and the sixth radiating portion are disposed on the first surface, the seventh radiating portion and the eighth radiating portion are disposed on the second surface, and an orthogonal projection of the fifth radiating portion that is projected onto the second surface overlaps with an orthogonal projection of the seventh radiating portion that is projected onto the second surface.

7. The wireless communication device according to claim 6, wherein a length of the first radiating portion is equal to a length of the third radiating portion, a width of the third radiating portion is greater than a width of the first radiating portion, a length of the second radiating portion is equal to a length of the fourth radiating portion, a length of the fifth radiating portion is equal to a length of the seventh radiating portion, a width of the seventh radiating portion is greater than a width of the fifth radiating portion, and a length of the sixth radiating portion is equal to a length of the eighth radiating portion.

8. The wireless communication device according to claim 1, wherein the antenna matching circuit further includes a circuit substrate, the circuit substrate has a first surface and a second surface that are opposite to each other, and the first transmission path, the second transmission path, the second SPDT switch, and the SPST switches are disposed on the first surface; wherein the first transmission path further includes a seventh section, the second transmission path further includes an eighth section, the first antenna element includes a first slot, the second antenna element includes a second slot, the first slot and the second slot are disposed on the second surface, a length of the first slot is equal to a length of the second slot, an orthogonal projection of the seventh section that is projected onto the second surface partially overlaps with an orthogonal projection of the first slot that is projected onto the second surface, a length of the seventh section is greater than a width of the first slot, an orthogonal projection of the eighth section that is projected onto the second surface partially overlaps with an orthogonal projection of the second slot that is projected onto the second surface, and a length of the eighth section is greater than a width of the second slot.

9. The wireless communication device according to claim 1, wherein, in response to the antenna matching circuit being switched to a third mode, the second SPDT switch is switched to the first transmission path, the SPST switches are in conducting states, and the first antenna element and the second antenna element are used to generate a third radiation pattern having a third polarization direction; wherein, in response to the antenna matching circuit being switched to a fourth mode, the second SPDT switch is switched to the second transmission path, the SPST switches are in the conducting states, and the first antenna element and the second antenna element are used to generate a fourth radiation pattern having a fourth polarization direction.

10. An antenna matching circuit, which is operable for an operating frequency, the antenna matching circuit comprising:
   a single pole double throw (SPDT) switch;
   a first antenna element and a second antenna element connected to the SPDT switch;
   a first transmission path and a second transmission path, wherein the first transmission path is connected between the first antenna element and the SPDT switch, and the second transmission path is connected between the second antenna element and the SPDT switch; and
   a plurality of single pole single throw (SPST) switches connected between the first transmission path and the second transmission path;
   wherein, in response to the antenna matching circuit being switched to a first mode, the SPDT switch is switched to the first transmission path, the SPST switches are in non-conducting states, and the first antenna element is used to generate a first radiation pattern; wherein, in response to the antenna matching circuit being switched to a second mode, the SPDT switch is switched to the second transmission path, the SPST switches are in the non-conducting states, and the second antenna element is used to generate a second radiation pattern; wherein the first radiation pattern has a first polarization direction, the second radiation pattern has a second polarization direction, and the first polarization direction is orthogonal to the second polarization direction.

11. The antenna matching circuit according to claim 10, wherein the first transmission path includes a first section, a second section, and a third section, the first section is connected to the SPDT switch, the third section is connected to the first antenna element, the second section is connected between the first section and the third section, the second section intersects with the first section at a first connection point, the second section intersects with the third section at a second connection point, the second transmission path includes a fourth section, a fifth section, and a sixth section, the fourth section is connected to the SPDT switch, the sixth section is connected to the second antenna element, the fifth section is connected between the fourth section and the sixth section, the fifth section intersects with the fourth section at a third connection point, the fifth section intersects with the sixth section at a fourth connection point, and lengths of the second section and the fifth section are both equal to one-fourth of the wavelength of the operating frequency.

12. The antenna matching circuit according to claim 11, further comprising a third transmission path, a fourth transmission path, and a fifth transmission path, wherein the third transmission path is connected between the first connection point and the third connection point, the fourth transmission path is connected between the second connection point and the fourth connection point, lengths of the third transmission path and the fourth transmission path are both equal to one-fourth of the wavelength of the operating frequency, impedance values of the third transmission path and the fourth transmission path are greater than impedance values of the second section and the fifth section, and the fifth transmission path is connected to the SPDT switch.

13. The antenna matching circuit according to claim 11, further comprising a third transmission path and a fourth transmission path, wherein the third transmission path is connected between the first connection point and the third connection point, the fourth transmission path is connected between the second connection point and the fourth connection point, lengths of the third transmission path and the fourth transmission path are both equal to one-fourth of the wavelength of the operating frequency, the SPST switches include a first SPST switch, a second SPST switch, a third SPST switch, and a fourth SPST switch, the first SPST switch and the second SPST switch are connected in series in the third transmission path, and the third SPST switch and the fourth SPST switch are connected in series in the fourth transmission path.

14. The antenna matching circuit according to claim 13, further comprising a plurality of capacitors, wherein the SPDT switch, the first SPST switch, the second SPST switch, the third SPST switch, and the fourth SPST switch include a plurality of terminals, and the capacitors are respectively connected to the terminals.

15. The antenna matching circuit according to claim 10, wherein, in response to the antenna matching circuit being switched to a third mode, the SPDT switch is switched to the first transmission path, the SPST switches are in conducting states, and the first antenna element and the second antenna element are used to generate a third radiation pattern having a third polarization direction; wherein, in response to the antenna matching circuit being switched to a fourth mode, the SPDT switch is switched to the second transmission path, the SPST switches are in the conducting states, and the first antenna element and the second antenna element are used to generate a fourth radiation pattern having a fourth polarization direction.

* * * * *